US011328699B2

(12) United States Patent
Maezawa

(10) Patent No.: US 11,328,699 B2
(45) Date of Patent: May 10, 2022

(54) MUSICAL ANALYSIS METHOD, MUSIC ANALYSIS DEVICE, AND PROGRAM

(71) Applicant: Yamaha Corporation, Shizuoka (JP)

(72) Inventor: Akira Maezawa, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 170 days.

(21) Appl. No.: 16/743,909

(22) Filed: Jan. 15, 2020

(65) Prior Publication Data

US 2020/0152162 A1 May 14, 2020

Related U.S. Application Data

(63) Continuation of application No. PCT/JP2018/026002, filed on Jul. 10, 2018.

(30) Foreign Application Priority Data

Jul. 19, 2017 (JP) ............................ JP2017-140368

(51) Int. Cl.
*G06F 17/00* (2019.01)
*G10H 1/00* (2006.01)

(52) U.S. Cl.
CPC ..... *G10H 1/0008* (2013.01); *G10H 2210/031* (2013.01); *G10H 2250/131* (2013.01)

(58) Field of Classification Search
CPC ........... G10H 1/0008; G10H 2210/031; G10H 2250/131
USPC ........................................................... 700/94
See application file for complete search history.

(56) References Cited

U.S. PATENT DOCUMENTS

2007/0022867 A1 2/2007 Yamashita
2010/0186576 A1 7/2010 Kobayashi
2011/0064290 A1* 3/2011 Punithakumar ....... G06T 7/0016 382/131
2014/0260911 A1 9/2014 Maezawa
2014/0260912 A1 9/2014 Maezawa
2014/0358265 A1 12/2014 Wang et al.
(Continued)

FOREIGN PATENT DOCUMENTS

JP 2007033851 A 2/2007
JP 2010122629 A 6/2010
(Continued)

OTHER PUBLICATIONS

International Search Report in PCT/JP2018/026002, dated Sep. 25, 2018.

*Primary Examiner* — Paul C McCord
(74) *Attorney, Agent, or Firm* — Global IP Counselors, LLP

(57) ABSTRACT

A music analysis method includes estimating a plurality of provisional points that are candidates for a specific point that has musical meaning in a musical piece from an audio signal of the musical piece by using a first process, selecting a part of a plurality of candidate points, which include the plurality of provisional points and a plurality of division points that divide intervals between the plurality of provisional points, as a plurality of selection points, and estimating a plurality of specific points in the musical piece from a result of calculating a probability that each of the plurality of selection points is the specific point by using a second process which is different from the first process.

13 Claims, 4 Drawing Sheets

(56) References Cited

U.S. PATENT DOCUMENTS

| | | | | |
|---|---|---|---|---|
| 2016/0086086 | A1* | 3/2016 | Gabillon | G06F 16/2457 706/11 |
| 2018/0150897 | A1* | 5/2018 | Wang | G06F 16/435 |
| 2018/0211393 | A1* | 7/2018 | Chen | G06K 9/00744 |
| 2018/0349466 | A1* | 12/2018 | Dadkhani | G06Q 30/0201 |
| 2019/0130211 | A1* | 5/2019 | Diestel | G06K 9/6215 |

FOREIGN PATENT DOCUMENTS

| | | | |
|---|---|---|---|
| JP | 2014178394 | A | 9/2014 |
| JP | 2014178395 | A | 9/2014 |
| JP | 2015079151 | A | 4/2015 |
| JP | 2015114360 | A | 6/2015 |
| JP | 2015114361 | A | 6/2015 |
| JP | 2015200803 | A | 11/2015 |

* cited by examiner

| | FALSE ESTIMATION RATE |
|---|---|
| RESULT 1 (FIRST PROCESS) | 12. 2% |
| RESULT 2 (K = N) | 6. 1% |
| RESULT 3 (K = 4) | 16. 2% |
| RESULT 4 (K = 8) | 10. 1% |
| RESULT 4 (K = 16) | 7. 6% |
| RESULT 4 (K = 32) | 6. 1% |

FIG. 5

MUSICAL ANALYSIS METHOD, MUSIC ANALYSIS DEVICE, AND PROGRAM

CROSS-REFERENCE TO RELATED APPLICATIONS

This application is a continuation application of International Application No. PCT/JP2018/026002, filed on Jul. 10, 2018, which claims priority to Japanese Patent Application No. 2017-140368 filed in Japan on Jul. 19, 2017. The entire disclosures of International Application No. PCT/JP2018/026002 and Japanese Patent Application No. 2017-140368 are hereby incorporated herein by reference.

BACKGROUND

Technological Field

The present invention relates to technology for analyzing audio signals that represent the sounds of a musical piece.

Background Information

Techniques for estimating a plurality of beat points in a musical piece by analyzing audio signals that represent the sounds of the musical piece have been proposed in the prior art. For example, Japanese Laid-Open Patent Application No. 2007-033851 discloses a configuration in which a time point at which the amount of change of a power spectrum of an audio signal is large is detected as a beat point. Japanese Laid-Open Patent Application No. 2015-114361 discloses a technique for estimating beat points from an audio signal by utilizing a probability model (for example, a hidden Markov model) in which is set the probability of a chord transition between beat points, and a Viterbi algorithm for estimating the maximum likelihood state sequence. In addition, S. Bock, F. Krebs, and G. Widmer, "Joint beat and downbeat tracking with recurrent neural networks," In Proc. of the 17th Int. Society for Music Information Retrieval Conf. (ISMIR), 2016 discloses a technique for estimating beat points from an audio signal by utilizing a recursive neural network.

In the technique of Japanese Laid-Open Patent Application No. 2007-033851 or Japanese Laid-Open Patent Application No. 2015-114361, although there is the benefit that the calculation amount that is required for estimating the beat points is small, there is the problem that a highly accurate estimate of the beat points is difficult to obtain in practice. On the other hand, in the technique of S. Bock, F. Krebs, and G. Widmer, "Joint beat and downbeat tracking with recurrent neural networks," In Proc. of the 17th Int. Society for Music Information Retrieval Conf. (ISMIR), 2016, while there is the benefit that the beat points can be estimated with high accuracy compared to the technique of Japanese Laid-Open Patent Application No. 2007-033851 or Japanese Laid-Open Patent Application No. 2015-114361, there is the problem that the calculation amount is large. In the description above, attention is paid to the estimation of beat points in a musical piece, but in a scenario in which not just beat points but also a musically meaningful time point in the musical piece is estimated, such as the head of a bar, the same kind of problem can occur.

SUMMARY

In consideration of the circumstances described above, an object of a preferred aspect of this disclosure is to estimate time points in a musical piece with high accuracy while reducing the calculation amount.

In order to solve the problem described above, a music analysis method according to a preferred aspect of this disclosure includes estimating a plurality of provisional points that are candidates for a specific point that has musical meaning in a musical piece from an audio signal of the musical piece by using a first process, selects a part of a plurality of candidate points, which include the plurality of provisional points and a plurality of division points that divide intervals between the plurality of provisional points, as a plurality of selection points, and estimating a plurality of specific points in the musical piece from a result of calculating a probability that each of the plurality of selection points is the specific point by using a second process which is different than the first process.

A non-transitory computer readable medium storing a program according to another aspect of this disclosure causes a computer to function as a first processing module that estimates a plurality of provisional points that are candidates for a specific point that has musical meaning in a musical piece from an audio signal of the musical piece by using a first process, a candidate selection module that selects a part of a plurality of candidate points, which include the plurality of provisional points and a plurality of division points that divide intervals between the plurality of provisional points, as a plurality of selection points, and a specific point estimation module that estimates a plurality of specific points in the musical piece from a result of calculating a probability that each of the plurality of selection points is the specific point by using a second process which is different than the first process.

BRIEF DESCRIPTION OF THE DRAWINGS

FIG. 5 is a chart illustrating the effects of the embodiment.

DETAILED DESCRIPTION OF THE EMBODIMENTS

Selected embodiments will now be explained with reference to the drawings. It will be apparent to those skilled in the field from this disclosure that the following descriptions of the embodiments are provided for illustration only and not for the purpose of limiting the invention as defined by the appended claims and their equivalents.

Figure 1:
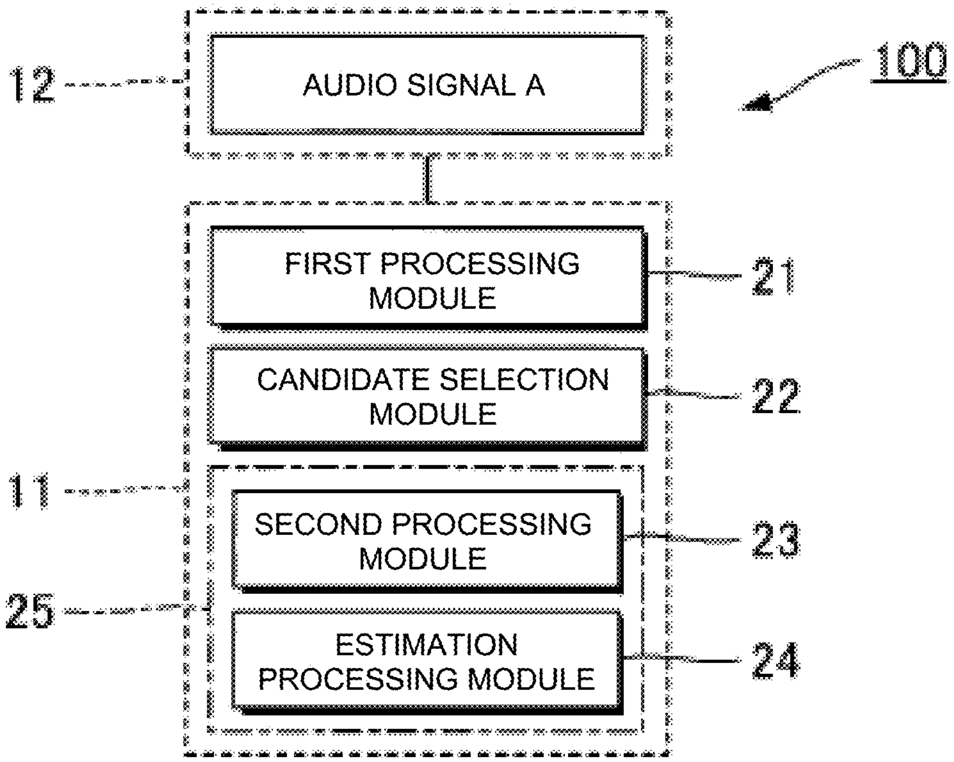
FIG. 1 is a block diagram illustrating a configuration of a music analysis device according to a preferred embodiment.

FIG. 1 is a block diagram illustrating a configuration of a music analysis device 100 according to a preferred embodiment. As shown in FIG. 1, the music analysis device 100 according to the present embodiment is realized by a computer system comprising an electronic controller 11 and a storage device 12. For example, various information processing devices such as a personal computer can be utilized as the music analysis device 100.

The term "electronic controller" as used herein refers to hardware that executes software programs. The electronic controller 11 is configured to include a processing circuit, such as a CPU (Central Processing Unit) having at least one processor. For example, the electronic controller 11 is realized by one or a plurality of chips. A program that is executed by the electronic controller 11 and various data that are used by the electronic controller 11 are stored in the storage device 12. For example, a known storage medium, such as a semiconductor storage medium or a magnetic storage medium, or a combination of a plurality of types of recording media, can be freely employed as the storage device 12. In other words, the storage device 12 is any computer storage device or any computer readable medium with the sole exception of a transitory, propagating signal. For example, the storage device 12 can be a computer memory device which can be nonvolatile memory and volatile memory.

The storage device 12 according to the present embodiment stores an audio signal A that represents the sounds of a musical piece (for example, instrument sounds or singing sounds). The music analysis device 100 according to the present embodiment estimates the beat points of the musical piece by analyzing the audio signal A. The beat points are time points on a time axis that are the foundation of the rhythm of the musical piece and are primarily present at equal intervals on the time axis.

As shown in FIG. 1, the electronic controller 11 of the present embodiment functions as a plurality of modules (first processing module 21, candidate selection module 22, second processing module 23, and estimation processing module 24) for estimating a plurality of the beat points in the musical piece by means of an analysis of the audio signal A, by executing a program stored in the storage device 12. Some of the functions of the electronic controller 11 can also be realized by a dedicated electronic circuit.

Figure 2:
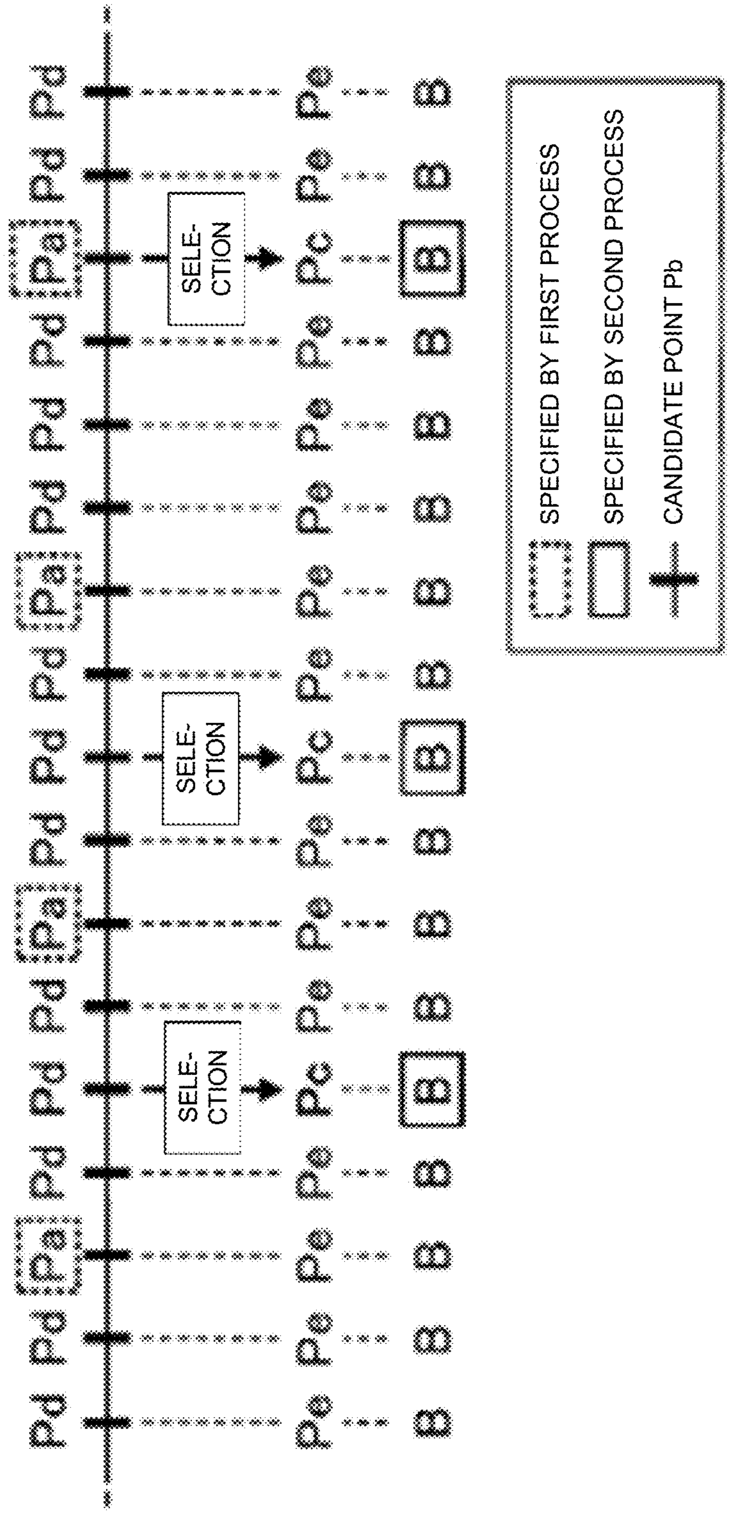
FIG. 2 is an explanatory view of an operation of the music analysis device.

The first processing module 21 estimates a plurality of time points (hereinafter referred to as "provisional points") Pa, which are candidates for beat points in the musical piece, by means of a first process on the audio signal A of said musical piece. As shown in FIG. 2, the provisional points Pa over the entire musical piece are estimated by the first process. The plurality of the provisional points Pa can correspond to the actual beat points (on-beats) of the musical piece, but can also correspond to, for example, off-beats. That is, there is the possibility that a phase difference exists between the time series of the plurality of provisional points Pa and the time series of the plurality of actual beat points. However, there is tendency that the time length of one beat of the musical piece (hereinafter referred to as "beat period") is likely to approximate or coincide with the interval between two consecutive provisional points Pa.

The candidate selection module 22 in FIG. 1 selects some (a part) of a plurality (N) of candidate points Pb including the plurality of provisional points Pa estimated by the first processing module 21 as a plurality of selection points Pc (N is an integer of 2 or more). As shown in FIG. 2, the N candidate points Pb are composed of the plurality of provisional points Pa estimated by the first processing module 21 and a plurality of division points Pd that divide the intervals between the plurality of provisional points Pa. The division points Pd in the present embodiment are time points that equally divide the interval (beat period) between two consecutive provisional points Pa on the time axis into Δn sections. That is, one beat of the musical piece is divided into Δn sections (in FIG. 2, Δn=4).

The candidate selection module 22 selects K (K<N) candidate points Pb from among the N candidate points Pb as selection points Pc (K is a natural number of 2 or more). For each of the K selection points Pc selected by the candidate selection module 22, the second processing module 23 calculates the probability (posterior probability) $B_n$ that said selection point Pc is a beat point (n=1 to N) by means of a second process that is different from the first process. In FIG. 2, the probability $B_n$ is represented by the reference symbol B.

The estimation processing module 24 in FIG. 1 estimates a plurality of the beat points in the musical piece from the result of the second process executed by the second processing module 23. Specifically, with respect to each of the candidate points Pb that the candidate selection module 22 did not select (hereinafter referred to as "non-selection point Pe"), the estimation processing module 24 calculates the probability $B_n$ that said non-selection point Pe is a beat point, from the probability $B_n$ calculated by the second processing module 23 for each of the selection points Pc. That is, the probability $B_n$ is calculated for each of the N candidate points Pb, composed of K selection points Pc and (N−K) non-selection points Pe. Then, the estimation processing module 24 estimates the beat points in the musical piece from each of the probabilities $B_n$ ($B_1$–$B_N$) of the N candidate points Pb. That is, some of the N candidate points Pb are selected as the beat points in the musical piece. As can be understood from the foregoing explanation, the second processing module 23 and the estimation processing module 24 function as a specific point estimation module 25 that estimates beat points in the musical piece from the result of calculating the probability $B_n$ for each of the K selection points Pc by means of the second process.

Specific examples of the first process and the second process will be described. The first process and the second process are different processes. Specifically, the first process is a process with less calculation amount than the second process. On the other hand, the second process is a process with a higher beat point estimation accuracy than the first process.

For example, the first process is a process that estimates a sound generation point of an instrument sound or a singing sound represented by the audio signal A as the provisional point Pa. Specifically, a process that estimates the time point at which the signal strength or the spectrum of the audio signal A changes as the provisional point Pa is suitable as the first process. A process that estimates the time point at which the chord changes as the provisional point Pa can also be executed as the first process. In addition, a process that estimates the provisional point Pa from the audio signal A by utilizing a Viterbi algorithm and a probability model such as the hidden Markov model, as disclosed in Japanese Laid-Open Patent Application No. 2015-114361, can be employed as the first process.

Figure 3:
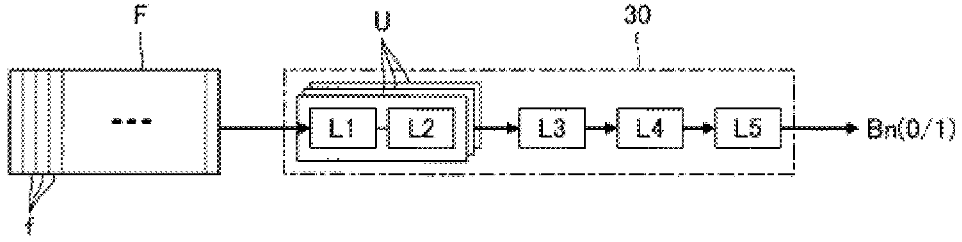
FIG. 3 is a block diagram illustrating a configuration of a neural network that is used for a second process.

The second process is a process that estimates beat points by using a neural network, for example. FIG. 3 is an explanatory view of the second process that utilizes a neural network 30. The neural network 30 illustrated in FIG. 3 is a deep neural network (DNN) having a structure in which three or more layers of a processing unit U including a convolutional layer L1 and a maximum value pooling layer L2 are stacked, and a first fully connected layer L3, a batch normalization layer L4, and a second fully connected layer L5 are connected. The activation function of the convolutional layer L1 and the first fully connected layer L3 is, for example, a rectified linear unit (ReLU), and the activation function of the second fully connected layer L5 is, for example, a softmax function.

The neural network 30 according to the present embodiment is a mathematical model that, from a feature amount F at an arbitrary candidate point Pb of the audio signal A, outputs the probability $B_n$ that said candidate point Pb is a beat point in the musical piece. The probability $B_n$ calculated by means of the second process is set to either 0 or 1. The feature amount F at one arbitrary candidate point Pb is a spectrogram within a unit period of time on the time axis including said candidate point Pb. Specifically, the feature amount F of the candidate point Pb is a time series of a plurality of intensity spectra f that correspond to a plurality of the candidate points Pb within the unit period of time. One arbitrary intensity spectrum f is a logarithmic spectrum, for example, that is scaled with a Mel frequency (MSLS: Mel-Scale Log-Spectrum).

The neural network 30 used in the second process is generated by means of machine learning that utilizes a plurality of teacher data that include the feature amount F and the probability $B_n$ (that is, correct answer data). That is, the neural network 30 is a learned model in which the relationship between the feature amount F of the audio signal A and the probability $B_n$ that the candidate point Pb is a beat point (an example of a specific point) has been learned. In the present embodiment, a non-recursive neural network 30 that does not include a recurrent (recurrent) connection is used. Thus, it is possible to output the probability $B_n$ regarding any candidate point Pb of the audio signal A without requiring the result of a process relating to a past time point.

As described above, because the beat point estimation accuracy of the second process is higher than that of the first process, only from the standpoint of improving the estimation accuracy is it desirable to execute the second process over all the sections of the musical piece. However, since the calculation amount of the second process is greater than that of the first process, it is not realistic to execute the second process over all the sections of the musical piece. In consideration of such circumstances, in the present embodiment, the candidate selection module 22 selects K selection points Pc from among the N candidate points Pb, including the plurality of provisional points Pa estimated in the first process, and the second processing module 23 executes the second process for each of the K selection points Pc, to thereby calculate the probability $B_n$. That is, whereas the first process is executed over all the sections of the musical piece, the second process is executed in a limited manner on a part of the musical piece (K selection points Pc from among N candidate points Pb).

Which candidate points Pb from among the N candidate points Pb should be selected as the selection points Pc will be evaluated. When the selection points Pc are selected, it is important to be able to appropriately calculate the probability $B_n$ of the non-selection points Pe from the probability $B_n$ calculated for the selection points Pc, while reducing the number of the selection points Pc for which the probability $B_n$ is calculated in the second process. In consideration of such circumstances, in the present embodiment, K selection points Pc are selected from N candidate points Pb so as to maximize the mutual information amount I (Gc;Ge) between a sequence Gc of the probability $B_n$ corresponding to the K selection points Pc and a sequence Ge of the (N−K) probabilities $B_n$ corresponding to the (N−K) non-selection points Pe.

The probability $B_n$ is modeled as a Gaussian process. A Gaussian process is a probability process expressed by the following Equation (1) for an arbitrary variable X and variable Y. The symbol N (a, b) in Equation 1 denotes a normal distribution (Gaussian distribution) of the mean a and the variance b.

$$[B_X, B_Y] \sim N([\mu(X);\mu(Y)], [\Sigma_{X,X}, \Sigma_{X,Y}, \Sigma_{Y,X}, \Sigma_{Y,Y}]) \tag{1}$$

The symbol $\Sigma_{X,Y}$ in Equation (1) is the cross-correlation between the variable X and variable Y. That is, the cross-correlation $\Sigma_{X,Y}$ means the degree to which any two candidate points Pb (Xth and Yth) selected from the N candidate points Pb co-occur. The cross-correlation $\Sigma_{X,Y}$ is learned in advance (specifically, before the processing according to the present embodiment) regarding, for example, a known musical piece. For example, the probability $B_n$ is calculated for all the candidate points Pb in the musical piece by means of the second process, the cross-correlation $\Sigma_{X,Y}$ is calculated by means of machine learning using the probability $B_n$ of each of the candidate points Pb and stored in the storage device 12. Assuming that the structure of correlation within a musical piece is time-invariant and common between different musical pieces, the cross-correlation $\Sigma_{X,Y}$ learned for a known musical piece can be applied to any unknown musical piece. The method for generating the cross correlation $\Sigma_{X,Y}$ is not limited to the machine learning exemplified above. For example, an autocorrelation matrix of the feature amount F can be used approximately as the cross-correlation $\Sigma_{X,Y}$.

The mutual information amount between the sequence Gc of the probability $B_n$ of each selection point Pc and the sequence Ge of the probability $B_n$ of each non-selection point Pe is an evaluation index that satisfies submodularity when the number K of selection points Pc is sufficiently small with respect to the number N of the candidate points Pb. Submodularity is a property in which the difference in the incremental value of a function that a single element makes when added to a set decreases as the size of the set increases (increase in elements). The problem of maximizing the mutual information amount (the so-called sensor placement problem) is NP-hard, but when focusing on the submodularity of the mutual information amount as described above, it is possible to more efficiently acquire a result that sufficiently approximates the optimum solution by means of a greedy algorithm. Based on the knowledge described above, maximization of the mutual information amount I (Gc; Ge) between the sequence Gc corresponding to the K selection points Pc and the sequence Ge corresponding to the (N−K) non-selection points Pe is evaluated below.

A set $S_k$ (k=1 to K) of selection points Pc sequentially selected from N candidate points Pb is assumed, and a candidate point Pb (identifier n) is sequentially added to the set $S_k$ as the selection point Pc so as to maximize the mutual information amount I (Gc; Ge) between the sequence Gc corresponding to the K selection points Pc and the sequence Ge corresponding to the (N−K) non-selection points Pe. When the number of selection points Pc reaches K, the set $S_k$ becomes fixed. The process for adding the candidate point Pb (identifier n) to the set $S_k$ so as to maximize the mutual information amount I (Gc; Ge) between the sequence Gc and the sequence Ge is expressed by the following Equation (2). The symbol I ($S_{k-1}$) in Equation (2) is the mutual information amount between a set $S_{k-1}$ of (k−1) selection points Pc selected from N candidate points Pb and a set of remaining candidate points Pb other than the set $S_{k-1}$.

$$S_k = S_{k-1} \cup \left\{ \underset{n}{\operatorname{argmax}} I(S_{k-1} \cup n) - I(S_{k-1}) \right\} \tag{2}$$

Inside the curly brackets { } in Equation (2) is an operation for selecting the identifier n at which the amount of increase in the mutual information amount (I ($S_{k-1}U_n$)-I ($S_{k-1}$)) before and after adding the candidate point Pb of the identifier n to the set Sk−1 becomes maximum. Thus, Equation (2) in a calculation to set the set $S_k$ by adding the candidate point Pb with the identifier n that maximizes the amount of increase in the mutual information amount to the immediately preceding set $S_{k-1}$ as the selection point Pc.

Equation (2) is expressed as the following formula (3).

$$S_k = S_{k-1} \cup \left\{ \underset{n}{\operatorname{argmax}} \, \delta_n \right\} \tag{3}$$

With consideration of Equations (1) and (2), the following Equation (4), which expresses the function $\delta_n$ of the Equation (3), is derived.

$$\delta_n = \frac{\sum_{n,n} - \sum_{n,S_{k-1}} \sum_{S_{k-1},S_{k-1}}^{-1} \sum_{S_{k-1},n}}{\sum_{n,n} - \sum_{n,\overline{S_{k-1}}} \sum_{\overline{S_{k-1}},\overline{S_{k-1}}}^{-1} \sum_{\overline{S_{k-1}},n}} \tag{4}$$

As can be understood from Equation (4), the probability $B_n$ that an arbitrary candidate point Pb in the musical piece is a beat point is not required for the calculation of Equation (4). Thus, it is possible to select K selection points Pc from N candidate points Pb by using Equations (3) and (4) before executing the second process for calculating the probability $B_n$.

Figure 4:
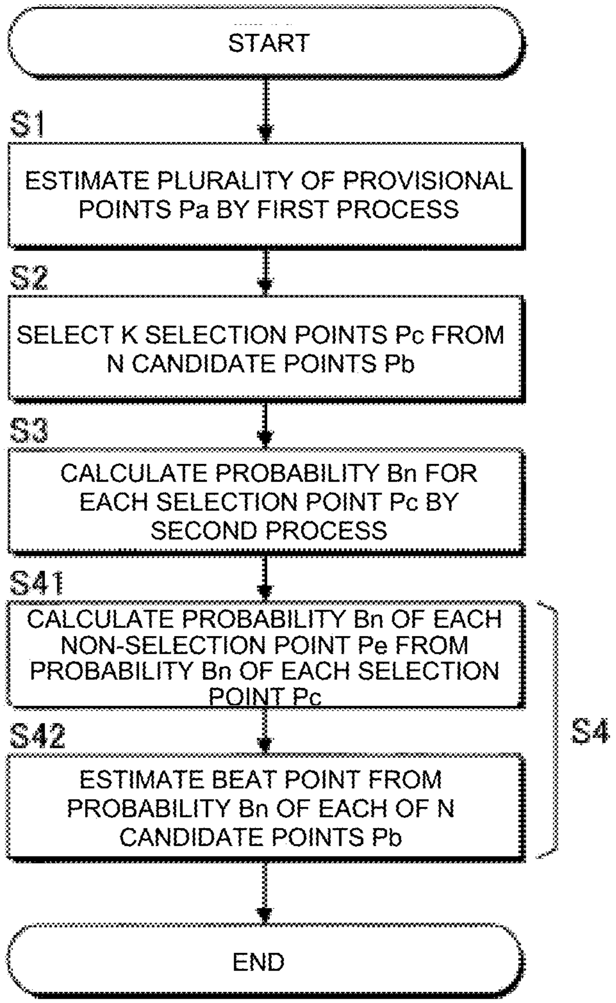
FIG. 4 is a flowchart of a process in which an electronic controller estimates beat points in a musical piece.

FIG. 4 is a flowchart illustrating the content of a process (music analysis method) in which the electronic controller 11 estimates the beat points in the musical piece. For example, the process of FIG. 4 is started in response to an instruction from the user.

First, the first processing module 21 estimates a plurality of the provisional points Pa that are candidates for beat points in the musical piece by executing the first process on the audio signal A (S1). The candidate selection module 22 selects K selection points Pc from N candidate points Pb including the plurality of provisional points Pa estimated in the first process and the plurality of division points Pd (S2). Specifically, the candidate selection module 22 selects the K selection points Pc (set $S_k$) by repeating the calculation of Equation (3). That is, the candidate selection module 22 selects the K selection points Pc from the N candidate points Pb so as to maximize the mutual information amount (an example of an evaluation index of submodularity) between the set $S_k$ of the K selection points Pc and the set of the (N−K) non-selection points Pe.

For each of the K selection points Pc selected by the candidate selection module 22, the second processing module 23 calculates the probability $B_n$ by means of the second process, which utilizes the non-recursive neural network 30 (S3). Specifically, the second processing module 23 calculates the feature amount F of each of the selection points Pc by analyzing the audio signal A and calculates the probability $B_n$ of said selection point Pc by assigning the feature amount F to the neural network 30.

The estimation processing module 24 estimates the beat points in the musical piece from the result of the second process executed by the second processing module 23 (probability $B_n$ that each of the selection points Pc is a beat point) (S4). Specifically, the process by which the estimation processing module 24 estimates the plurality of beat points in the musical piece includes the process for calculating the probability $B_n$ for each of the plurality of non-selection points Pe (S41) and the process for estimating the beat points from the probability $B_n$ calculated for the N candidate points Pb (S42). Specific examples of each process will be described in detail below.

First, the estimation processing module 24 calculates the probability $B_n$ for each of the (N−K) non-selection points Pe that the candidate selection module 22 did not select, from the probability $B_n$ calculated by the second processing module 23 by means of the second process for each of the selection points Pc (S41). Specifically, the estimation processing module 24 calculates the probability distribution regarding the probability $B_n$ of each of the non-selection points Pe. The probability distribution of the probability $B_n$ of the non-selection points Pe is defined by expected value $E(B_n)$ expressed by the following Equation (5) and variance $V(B_n)$ expressed by Equation (6).

$$E(B_n)=\Sigma_{n,S_k}\Sigma_{S_K,S_k}{}^{-1}GC \tag{5}$$

$$V(B_n)=\Sigma_{n,n}-\Sigma_{n,S_K}\Sigma_{S_k,S_K}{}^{-1}\Sigma_{S_K,n} \tag{6}$$

The estimation processing module 24 selects some of the N candidate points Pb as beat points in the musical piece in accordance with the probability $B_n$ of each of the candidate points Pb. Specifically, the estimation processing module 24 estimates the time series of the plurality of candidate points Pb with which the summation of the probability $B_n$ becomes maximum as a plurality of beat points in the musical piece.

As described above, the N candidate points Pb are composed of the plurality of provisional points Pa estimated by the first processing module 21 and a plurality of division points Pd that divide the intervals between the plurality of provisional points Pa into Δn sections. Thus, if it is assumed that one Λth candidate point (hereinafter referred to as "specific candidate point") Pb from among the N candidate points Pb could be estimated to correspond to a beat point, the identifier n of the candidate point Pb that is estimated as a beat point after the specific candidate point Pb is expressed by the following Equation (7). The symbol m in Equation (7) is a non-negative integer (m=0, 1, 2, . . . ). For example, assuming that the beat period is divided into four sections (Δn=4), each of the Λth (specific candidate point Pb), (Λ+4)th, (Λ+8)th, (Λ+12)th . . . candidate points Pb from among the N candidate points Pb corresponds to a beat point in the musical piece.

$$n=\Lambda+m\Delta n \tag{7}$$

The identifier Λ of the specific candidate point Pb is set to a variable λ that maximizes a reliability index R(λ), as expressed by the following Equation (8).

$$\Lambda = \underset{\lambda}{\operatorname{argmax}} \, R(\lambda) \tag{8}$$

The reliability index R(λ) in Equation (8) is expressed by the following Equation (9).

$$R(\lambda) = \sum_{m}^{N/\Delta n} B_{\lambda+m\Delta n} \tag{9}$$

As can be understood from Equation (9), the reliability index R(λ) is the numerical value obtained by summing the probabilities $B_n$ of the plurality of candidate points Pb present for each beat period from the λth candidate point Pb. As can be understood from the description above, the reliability index R(λ) is an index of the reliability that the time series of the plurality of candidate points Pb present for each beat period from the λth candidate point Pb corresponds to the beat points in the musical piece. That is, as the reliability index R(λ) increases, there is a greater probability that the plurality of candidate points Pb present for each beat period from the λth candidate point Pb will correspond to the beat points in the musical piece.

The estimation processing module 24 calculates the reliability index R(λ) of the Equation (9) for each of the plurality of candidate points Pb and selects the variable λ with which the reliability index R(λ) becomes maximum as the identifier Λ of the specific candidate point Pb (Equation (8)). Then, as shown in Equation (7), from among the N candidate points Pb, the Λth specific candidate point Pb and the candidate points Pb present for each beat period from said specific candidate point Pb are estimated as the beat points in the musical piece.

As described above, in the present embodiment, K selection points Pc are selected from among the N candidate points Pb, including the plurality of provisional points Pa estimated in the first process, and the plurality of beat points in the musical piece are estimated in accordance with the probability $B_n$ calculated for each of the K selection points Pc by means of the second process. Thus, compared to a configuration in which the second process is executed over all the sections in the musical piece, it is possible to estimate the beat points in the musical piece with high accuracy while reducing the calculation amount of the second process.

In particular, in the present embodiment, since the calculation amount of the first process is less than that of the second process, the calculation amount required for estimating the beat points in the musical piece is reduced compared to a configuration in which the second process is executed over the entire musical piece. On the other hand, since the second process has a higher beat point estimation accuracy than the first process, it is possible to estimate the beat points with high accuracy compared to a configuration in which the beat points in the musical piece are estimated by means of only the first process. That is, the effect that the beat points can be estimated with high accuracy while reducing the calculation amount is particularly remarkable.

In addition, in the present embodiment, K selection points are selected from N candidate points Pb so as to maximize the evaluation index of submodularity (specifically, the mutual information amount). Thus, there is the benefit that it is possible to efficiently select more appropriate selection points by, for example, a greedy algorithm.

In addition, in the present embodiment, the probability $B_n$ that the non-selection point Pe is a beat point is calculated in accordance with the probability $B_n$ of the selection point Pc. That is, the probability $B_n$ ($B_1$ to $B_N$) is calculated for each of the N candidate points Pb in the musical piece. By means of the aspect described above, there is the advantage that the beat points in the musical piece can be estimated with high accuracy by taking into account the probability $B_n$ of the non-selection point Pe in addition to the probability $B_n$ of the selection point Pc.

FIG. 5 is a chart illustrating the accuracy of estimating the beat points in the musical piece. FIG. 5 shows the ratio of the musical pieces for which the beat points could not be accurately estimated from among a plurality of musical pieces (hereinafter referred to as "false estimation rate") for each of a plurality of cases in which the number K of the selection points Pc selected from the N candidate points Pb was changed (K=N, 4, 8, 16, 32). Result 1 in FIG. 5 is the case in which the provisional point Pa estimated in the first process conducted on the audio signal A was determined as a beat point. Result 2 (K=N) is the case in which the beat points were estimated after calculating the probability $B_n$ for all of the N candidate points Pb by means of the second process. The number N of the candidate points Pb was about 1,700.

As can be understood from FIG. 5, by selecting 8 or more of the N candidate points Pb as the selection points Pc, it is possible to estimate the beat points with high accuracy compared to the case in which the beat points are estimated by means of only the first process (Result 1). In addition, it can be confirmed from FIG. 5 that when 32 of the N candidate points Pb are selected as the selection points Pc, it is possible to estimate the beat points with the same accuracy (false estimation rate of 6.1%) as the case in which the probability $B_n$ is calculated for all of the N candidate points Pb by means of the second process (Result 2). That is, it is possible to reduce the number of the selection points Pc, which are the target of the second process, by about 98% (1,700 to 32) while maintaining the same accuracy of estimating the beat points in the musical piece.

Modified Examples

Each of the embodiments exemplified above can be variously modified. Specific modified embodiments are illustrated below. Two or more embodiments arbitrarily selected from the following examples can be appropriately combined as long as they are not mutually contradictory.

(1) In the foregoing embodiment, the beat points in the musical piece are estimated, but the time points in the musical piece to be specified by the preferred aspect of this disclosure are not limited to beat points. For example, this disclosure can also be applied to the case for specifying the time point of the head of a bar in the musical piece. As can be understood from the foregoing explanation, the preferred aspect of this disclosure is appropriately used for estimating a specific point that has musical meaning in the musical piece (for example, a beat point, a head of a bar, etc.). The beat points estimated by the above-mentioned embodiment are effectively used for various purposes, such as music reproduction, acoustic processing, and the like.

(2) In the foregoing embodiment, an example was presented in which the mutual information amount is maximized, but the evaluation index of submodularity is not limited to the mutual information amount. For example, entropy or variance can be maximized as the evaluation index of submodularity.

(3) In the foregoing embodiment, it is also possible to realize the music analysis device 100 with a server device that communicates with terminal devices (for example, mobile phones and smartphones) via a communication network such as a mobile communication network or the Internet. Specifically, the music analysis device 100 estimates a plurality of beat points in the musical piece by means of processing the audio signal A received from a terminal device and transmits the estimation result (for example, data indicating the position of each beat point) to the terminal device.

(4) For example, the following configurations can be understood from the embodiments exemplified above.

A music analysis method according to one aspect of this disclosure is a method in which a computer (a computer system composed of a single computer or a plurality of computers) estimates a plurality of provisional points that are candidates for a specific point that has musical meaning in a musical piece from an audio signal of said musical piece by means of a first process, selects some of a plurality of candidate points, which include the plurality of provisional points and a plurality of division points that divide the intervals between the plurality of provisional points, as a plurality of selection points, and estimates a plurality of specific points in the musical piece from the result of calculating the probability that, for each of the plurality of selection points, the selected point is a specific point by means of a second process, which is different from the first process. In the aspect described above, some of the plurality of candidate points including the plurality of provisional points estimated by means of the first process are selected as the plurality of selection points, and a plurality of specific point in the musical piece are estimated in accordance with the probability calculated for each of the plurality of selection points by means of the second process. Thus, compared to a configuration in which the second process is executed over the entire musical piece, it is possible to reduce the calculation amount of the second process.

In another aspect, the second process is a process for calculating the probability that the selection point is a specific point from a feature amount corresponding to the selection point of the audio signal. According to the aspect described above, since the probability that the selection point is a specific point is calculated from the feature amount corresponding to each of the selection points in the audio signal, it is possible to appropriately estimate the specific points in the musical piece.

In another aspect, the second process is a process for calculating the probability that each of the plurality of selection points is the specific point by using a learned model in which the relationship between a feature amount of an audio signal and the probability that a selection point is a specific point has been learned. According to the aspect described above, it is possible to specify an appropriate probability with respect to the feature amount of an unknown audio signal based on the tendency between the probability and the feature amount latent in the teacher data used for the machine learning of the learned model.

In another aspect, when the plurality of selection points are selected, the plurality of selection points are selected from the plurality of candidate points so as to maximize the evaluation index of submodularity between a set of the plurality of selection points and a set of a plurality of non-selection points that are not selected as the selection points from among the plurality of candidate points. In the aspect described above, a plurality of selection points are selected so as to maximize the evaluation index of submodularity. Thus, there is the benefit that it is possible to efficiently select more appropriate selection points by using a greedy algorithm, for example.

In another aspect, for each of the plurality of non-selection points, the probability that the non-selection point is the specific point is calculated in accordance with the probability calculated for each of the selection points by means of the second process, and in the estimation of the plurality of specific points, a plurality of specific points in the musical piece are estimated in accordance with the probability calculated for each of the selection points and the probability calculated for each of the non-selection points. In the aspect described above, the probability that the non-selection point is the specific point is calculated in accordance with the probability of the selection point, and the specific point in the musical piece is estimated in accordance with the probability that each of the plurality of provisional points including the selection points and the non-selection points is the specific point. Thus, there is the advantage that the plurality of specific points in the musical piece can be estimated with high accuracy.

In another aspect, the calculation amount of the first process is less than that of the second process. In the aspect described above, since the calculation amount of the first process is less than that of the second process, the calculation amount required for estimating the specific points in the musical piece is reduced compared to a configuration in which the second process is executed over the entire musical piece.

In another aspect, the second process has a higher specific point estimation accuracy than the first process. In the aspect described above, it is possible to estimate the specific points with high accuracy compared to a configuration in which the specific points in the musical piece are estimated by means of only the first process. According to a configuration having both aspects 6 and 7, there is the advantage that the specific points can be estimated with high accuracy while the calculation amount is reduced.

The preferred aspect of this disclosure can also be realized by a music analysis device that executes the music analysis method of each aspect exemplified above or by a program that causes a computer to execute the music analysis method of each aspect exemplified above.

For example, a music analysis device according to a preferred aspect of this disclosure comprises a first processing module that estimates a plurality of provisional points that are candidates for a specific point that has musical meaning in a musical piece from an audio signal of the musical piece by means of a first process; a candidate selection module that selects some of a plurality of candidate points, which include the plurality of provisional points and a plurality of division points that divide the intervals between the plurality of provisional points, as a plurality of selection points; and a specific point estimation module that estimates a plurality of specific points in the musical piece from the result of calculating the probability that each of the plurality of selection points is a specific point by means of a second process, which is different from the first process.

In addition, a program according to a preferred aspect of this disclosure causes a computer to function as a first processing module that estimates a plurality of provisional points that are candidates for a specific point that has musical meaning in a musical piece from an audio signal of said musical piece by means of a first process; as a candidate selection module that selects some of a plurality of candidate points, which include the plurality of provisional points and a plurality of division points that divide the intervals between the plurality of provisional points, as a plurality of selection points; and as a specific point estimation module that estimates a plurality of specific points in the musical piece from the result of calculating the probability that, for each of the plurality of selection points, the selected point is a specific point by means of a second process, which is different from the first process.

The program according to a preferred aspect of this disclosure is, for example, stored on a computer-readable storage medium and installed on a computer. The storage medium is, for example, a non-transitory storage medium, a good example being an optical storage medium (optical disc) such as a CD-ROM, but can include storage media of any known format, such as a semiconductor storage medium or a magnetic storage medium. Non-transitory storage media include any storage medium that excludes transitory propagating signals and does not exclude volatile storage media.

Furthermore, the program can be delivered to a computer in the form of distribution via a communication network.

What is claimed is:

1. A music analysis method realized by a computer, comprising:

estimating a plurality of provisional points that are candidates for a specific point that has musical meaning in a musical piece from an audio signal of the musical piece by using a first process;

selecting a part of a plurality of candidate points, which include the plurality of provisional points and a plurality of division points that divide intervals between the plurality of provisional points, as a plurality of selection points; and estimating a plurality of specific points in the musical piece from a result of calculating a probability that each of the plurality of selection points is the specific point by using a second process which is different from the first process, in the selecting as the plurality of selection points, the plurality of selection points being selected from the plurality of candidate points so as to maximize an evaluation index of submodularity between a set of the plurality of selection points and a set of a plurality of non-selection points that are not selected as the plurality of selection points from among the plurality of candidate points.

2. The music analysis method according to claim 1, wherein in the second process, the probability that each of the plurality of selection points is the specific point is calculated from a feature amount corresponding to each of the plurality of selection points of the audio signal.

3. The music analysis method according to claim 2, wherein in the second process, the probability that each of the plurality of selection points is the specific point is calculated by using a learned model in which a relationship between a feature amount of the audio signal and the probability that each of the plurality of selection points is the specific point has been learned.

4. The music analysis method according to claim 1, wherein in the estimating of the plurality of specific points, for each of the plurality of non-selection points, a probability that each of the plurality of non-selection points is the specific point is calculated in accordance with the probability calculated for each of the plurality of selection points by using the second process, and the plurality of specific points in the musical piece are estimated in accordance with the probability calculated for each of the plurality of selection points and the probability calculated for each of the plurality of non-selection points.

5. The music analysis method according to claim 1, wherein a calculation amount of the first process is less than a calculation amount of the second process.

6. The music analysis method according to claim 1, wherein the second process has a higher specific point estimation accuracy than the first process.

7. A music analysis device comprising:

an electronic controller including at least one processor, the electronic controller being configured to execute a plurality of modules including a first processing module that estimates a plurality of provisional points that are candidates for a specific point that has musical meaning in a musical piece from an audio signal of the musical piece by using a first process;

a candidate selection module that selects a part of a plurality of candidate points, which include the plurality of provisional points and a plurality of division points that divide intervals between the plurality of provisional points, as a plurality of selection points; and a specific point estimation module that estimates a plurality of specific points in the musical piece from a result of calculating a probability that each of the plurality of selection points is the specific point by using a second process which is different from the first process, the candidate selection module selecting the plurality of selection points from the plurality of candidate points so as to maximize an evaluation index of submodularity between a set of the plurality of selection points and a set of a plurality of non-selection points that are not selected as the plurality of selection points from among the plurality of candidate points.

8. The music analysis device according to claim 1, wherein the specific point estimation module calculates the probability that each of the plurality of selection points is the specific point from a feature amount corresponding to each of the plurality of selection points of the audio signal in the second process.

9. The music analysis device according to claim 8, wherein the specific point estimation module calculates the probability that each of the plurality of selection points is the specific point by using a learned model in which a relationship between a feature amount of the audio signal and the probability that each of the plurality of selection points is the specific point has been learned, in the second process.

10. The music analysis device according to claim 7, wherein the specific point estimation module calculates, for each of the plurality of non-selection points, a probability that each of the plurality of non-selection points is the specific point in accordance with the probability calculated for each of the plurality of selection points by using the second process, and estimates the plurality of specific points in the musical piece in accordance with the probability calculated for each of the plurality of selection points and the probability calculated for each of the plurality of non-selection points.

11. The music analysis device according to claim 7, wherein a calculation amount of the first process is less than a calculation amount of the second process.

12. The music analysis device according to claim 7, wherein the second process has a higher specific point estimation accuracy than the first process.

13. A non-transitory computer readable medium storing a program that causes a computer to function as a first processing module that estimates a plurality of provisional points that are candidates for a specific point that has musical meaning in a musical piece from an audio signal of the musical piece by using a first process;

a candidate selection module that selects a part of a plurality of candidate points, which include the plurality of provisional points and a plurality of division points that divide intervals between the plurality of provisional points, as a plurality of selection points; and a specific point estimation module that estimates a plurality of specific points in the musical piece from a result of calculating a probability that each of the plurality of selection points is the specific point by using a second process which is different from the first process, the candidate selection module selecting the plurality of selection points from the plurality of candidate points so as to maximize an evaluation index of submodularity between a set of the plurality of selection points and a set of a plurality of non-selection points that are not selected as the plurality of selection points from among the plurality of candidate points.

* * * * *